United States Patent
Hale et al.

(10) Patent No.: US 12,037,870 B1
(45) Date of Patent: Jul. 16, 2024

(54) MITIGATING LOST CIRCULATION

(71) Applicants: Saudi Arabian Oil Company, Dhahran (SA); Newpark Drilling Fluids LLC, Katy, TX (US)

(72) Inventors: Arthur Herman Hale, Houston, TX (US); Ahmed Said Abdelaziz Amer, Katy, TX (US)

(73) Assignees: Newpark Drilling Fluids LLC, Katy, TX (US); Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/167,550

(22) Filed: Feb. 10, 2023

(51) Int. Cl.
| | | |
|---|---|---|
| *E21B 33/12* | (2006.01) | |
| *C09K 8/42* | (2006.01) | |
| *C09K 8/487* | (2006.01) | |
| *E21B 33/138* | (2006.01) | |
| *E21B 36/00* | (2006.01) | |
| *E21B 36/04* | (2006.01) | |

(52) U.S. Cl.
CPC ............ *E21B 33/138* (2013.01); *C09K 8/426* (2013.01); *C09K 8/487* (2013.01); *E21B 33/1208* (2013.01); *E21B 36/003* (2013.01); *E21B 36/04* (2013.01); *E21B 33/12* (2013.01)

(58) Field of Classification Search
None
See application file for complete search history.

(56) References Cited

U.S. PATENT DOCUMENTS

| | | | |
|---|---|---|---|
| 6,523,610 B1 * | 2/2003 | Griffith | ................ E21B 43/10 166/57 |
| 7,077,199 B2 | 7/2006 | Vinegar et al. | |
| 7,086,465 B2 | 8/2006 | Wellington et al. | |
| 7,090,013 B2 | 8/2006 | Wellington | |
| 7,100,994 B2 | 9/2006 | Vinegar et al. | |

(Continued)

OTHER PUBLICATIONS cerma.ulaval.ca [online], "Materials Science Application in Plug and Abandonment of Oil and Gas Wells," available on or before Feb. 14, 2024, via Internet Archive: Wayback Machine, URL<https://web.archive.org/web/20240214194119/https://cerma.ulaval.ca/wp-content/uploads/2021/02/Soheil-Akbari-Kazemi-_TL.pdf>, retrieved on Feb. 14, 2024, URL<https://cerma.ulaval.ca/wp-content/uploads/2021/02/Soheil-Akbari-Kazemi-_TL.pdf>, 7 pages.

(Continued)

*Primary Examiner* — Andrew Sue-Ako
(74) *Attorney, Agent, or Firm* — Fish & Richardson P.C.

(57) ABSTRACT

A eutectic metal alloy is placed through a coiled tubing into a wellbore formed in a subterranean formation. The eutectic metal alloy includes a mixture of multiple metals. The eutectic metal alloy has a melting temperature that is less than a melting temperature of each individual metal of the multiple metals making up the eutectic metal alloy. The eutectic metal alloy is heated to a temperature equal to or greater than the melting temperature of the eutectic metal alloy to liquefy the eutectic metal alloy. The liquefied eutectic metal alloy is flowed from the wellbore and into the subterranean formation, thereby exposing the liquefied eutectic metal alloy to a specified downhole temperature within the subterranean formation and causing the liquefied eutectic metal alloy to solidify to form a seal. The seal prevents fluid from flowing from the wellbore and into the subterranean formation.

18 Claims, 14 Drawing Sheets

(56) References Cited

U.S. PATENT DOCUMENTS

| | | |
|---|---|---|
| 7,104,319 B2 | 9/2006 | Vinegar et al. |
| 7,114,566 B2 | 10/2006 | Vinegar et al. |
| 7,121,341 B2 | 10/2006 | Vinegar et al. |
| 7,121,342 B2 | 10/2006 | Vinegar et al. |
| 7,128,153 B2 | 10/2006 | Vinegar et al. |
| 7,156,176 B2 | 1/2007 | Vinegar et al. |
| 7,219,734 B2 | 5/2007 | Bai et al. |
| 7,320,364 B2 | 1/2008 | Fairbanks |
| 7,353,872 B2 | 4/2008 | Sandberg |
| 7,357,180 B2 | 4/2008 | Vinegar et al. |
| 7,360,588 B2 | 4/2008 | Vinegar et al. |
| 7,370,704 B2 | 5/2008 | Harris |
| 7,383,877 B2 | 6/2008 | Vinegar et al. |
| 7,424,915 B2 | 9/2008 | Vinegar |
| 7,431,076 B2 | 10/2008 | Sandberg et al. |
| 7,435,037 B2 | 10/2008 | McKinzie, II |
| 7,461,691 B2 | 12/2008 | Vinegar et al. |
| 7,475,724 B2 | 1/2009 | Pribnow et al. |
| 7,481,274 B2 | 1/2009 | Vinegar et al. |
| 7,490,665 B2 | 2/2009 | Sandberg et al. |
| 7,500,528 B2 | 3/2009 | McKinzie, II et al. |
| 7,510,000 B2 | 3/2009 | Pastor-Sanz et al. |
| 7,527,094 B2 | 5/2009 | McKinzie et al. |
| 7,546,873 B2 | 6/2009 | Kim et al. |
| 7,575,052 B2 | 8/2009 | Sandberg et al. |
| 7,575,053 B2 | 8/2009 | Vinegar et al. |
| 7,640,980 B2 | 1/2010 | Vinegar et al. |
| 7,831,133 B2 | 11/2010 | Vinegar et al. |
| 7,831,134 B2 | 11/2010 | Vinegar et al. |
| 7,860,377 B2 | 12/2010 | Vinegar et al. |
| 7,942,197 B2 | 5/2011 | Fairbanks et al. |
| 7,942,203 B2 | 5/2011 | Vinegar et al. |
| 7,986,869 B2 | 7/2011 | Vinegar et al. |
| 8,027,571 B2 | 9/2011 | Vinegar et al. |
| 8,070,840 B2 | 12/2011 | Diaz et al. |
| 8,200,072 B2 | 6/2012 | Vinegar et al. |
| 8,224,163 B2 | 7/2012 | Sandberg et al. |
| 8,224,164 B2 | 7/2012 | Sandberg et al. |
| 8,224,165 B2 | 7/2012 | Vinegar et al. |
| 8,230,927 B2 | 7/2012 | Fairbanks et al. |
| 8,233,782 B2 | 7/2012 | Vinegar et al. |
| 8,238,730 B2 | 8/2012 | Sandberg et al. |
| 8,355,623 B2 | 1/2013 | Vinegar et al. |
| 8,579,031 B2 | 11/2013 | Vinegar |
| 8,627,887 B2 | 1/2014 | Vinegar et al. |
| 9,399,907 B2 | 7/2016 | Mo et al. |
| 10,053,950 B2 | 8/2018 | Carragher |
| 10,113,386 B2 | 10/2018 | Carragher |
| 10,145,203 B2 | 12/2018 | Carragher |
| 10,161,215 B2 | 12/2018 | Carragher |
| 10,273,563 B2 | 4/2019 | Marya |
| 10,309,187 B2 | 6/2019 | Carragher |
| 10,316,612 B2 | 6/2019 | Shafer |
| 10,584,554 B2 | 3/2020 | Shafer |
| 10,697,249 B2 | 6/2020 | Madrid et al. |
| 10,738,567 B2 | 8/2020 | Shafer |
| 10,760,374 B2 | 9/2020 | Hearn et al. |
| 10,871,050 B2 | 12/2020 | Hearn et al. |
| 10,941,630 B2 | 3/2021 | Carragher |
| 11,053,771 B2 | 7/2021 | Carragher |
| 2006/0144591 A1* | 7/2006 | Gonzalez .............. E21B 29/10 166/57 |
| 2015/0233211 A1* | 8/2015 | Bujold .................. E21B 36/00 166/60 |
| 2022/0090463 A1* | 3/2022 | Louden ............... E21B 33/134 |

OTHER PUBLICATIONS

Sandberg et al., "History and Application of Resistance Electrical Heaters in Downhole Oil Field Applications," presented at the SPE Western Regional & AAPG Pacific Section Meeting Joint Technical Conference, Monterey, California, Apr. 19, 2013, 1 page.

The Cutting Edge: Interfacial Dynamics of Cutting and Grinding, U.S. Department of Health, Education, and Welfare, Pearlman (ed.)., 1976, 277 pages.

Traeger et al., "Drilling, Instrumentation and Sampling Considerations for Geoscience Studies of Magma-Hydrothermal Regimes," Sandia National Laboratories, 1981, 58 pages.

wikipedia.org [online], "Oxide," available on or before Sep. 27, 2007, retrieved on Feb. 14, 2024, retrieved from URL <https://en.wikipedia.org/wiki/Oxide#Oxides_of_metals>, 6 pages.

wikipedia.org [online], "Powder metallurgy," available on or before Nov. 13, 2007, retrieved on Feb. 14, 2024, retrieved from URL <https://en.wikipedia.org/wiki/Powder_metallurgy>, 13 pages.

wikipedia.org [online], "Pyrotechnic composition," available on or before Jul. 22, 2009, retrieved on Feb. 14, 2024, retrieved from URL <https://en.wikipedia.org/wiki/Pyrotechnic_composition>, 9 pages.

* cited by examiner

MITIGATING LOST CIRCULATION

TECHNICAL FIELD

This disclosure relates to mitigation of lost circulation in subterranean formations.

BACKGROUND

In oil or gas well drilling, cementing, completions, and workovers, lost circulation is an undesirable situation in which drilling fluid, also known as mud, flows into a subterranean formation instead of returning up to the surface. In partial lost circulation, mud continues to flow to the surface with some loss of mud to the formation. In total lost circulation, all the mud flows into the formation with no return to the surface. The consequences of lost circulation can range from a loss of drilling fluid to blowout or even loss of life. Prevention of lost circulation is desirable, but because lost circulation is such a common occurrence, remediation methods can help mitigate lost circulation when it has occurred.

SUMMARY

This disclosure describes technologies relating to mitigating lost circulation in wells. Certain aspects of the subject matter described can be implemented as a method. A eutectic metal alloy is placed, for example, via pipe, wireline, or coiled tubing into a wellbore formed in a subterranean formation. The eutectic metal alloy includes a mixture of metals. The eutectic metal alloy has a melting temperature that is less than a melting temperature of each individual metal of the multiple metals making up the eutectic metal alloy. The eutectic metal alloy is heated to a temperature equal to or greater than the melting temperature of the eutectic metal alloy to liquefy the eutectic metal alloy. The liquefied eutectic metal alloy is flowed from the wellbore and into the subterranean formation, thereby exposing the liquefied eutectic metal alloy to a specified downhole temperature within the subterranean formation and causing the liquefied eutectic metal alloy to solidify to form a seal, for example, in the fracture-formation matrix. The seal prevents fluid from flowing from the wellbore and into the subterranean formation.

This, and other aspects, can include one or more of the following features. Heating the eutectic metal alloy can include placing a cable heater coupled to the coiled tubing at a downhole location within the wellbore and providing power to the cable heater. The cable heater can include a heating element, an insulation layer, and a sheath. The heating element can be configured to generate heat in response to receiving power. The insulation layer can surround the heating element. The insulation layer can include magnesium oxide. The sheath can surround the insulation layer. The sheath can include steel. Prior the placing the eutectic metal alloy with the coiled tubing into the wellbore, a packer or a bridge plug can be positioned downhole of the downhole location within the wellbore. After positioning the packer or bridge plug and prior to placing the eutectic metal alloy with the coiled tubing into the wellbore, the bridge plug or packer can seal against an inner wall of the wellbore, thereby preventing fluid from flowing further downhole past the bridge plug or packer. The eutectic metal alloy can have a density of at least about 8.0 grams per cubic centimeter ($g/cm^3$). The eutectic metal alloy can have a density in a range of from about 8.0 $g/cm^3$ to about 11.0 $g/cm^3$. The eutectic metal alloy can include particles having an average particle size in a range of from about 1 micrometer to about 0.25 centimeters. The liquefied eutectic metal alloy can have a viscosity of less than 10 centipoise (cP) or less than 5 cP. The liquefied eutectic metal alloy can have a viscosity in a range of from about 1 cP to about 10 cP or from about 1 cP to about 5 cP. The eutectic metal alloy can be suspended in a carrier fluid. The carrier fluid can include bentonite clay. The carrier fluid can include a polymer and a crosslinking agent. The crosslinking agent can be configured to crosslink the polymer in response to exposure to the specified downhole temperature to slow down loss of fluid. The seal can include the solidified eutectic metal alloy distributed across a crosslinked polymer matrix. Bentonite clay or polymer can include the solidified eutectic metal alloy distributed throughout the carrier fluid. The polymer can include hydroxyethyl cellulose.

Certain aspects of the subject matter described can be implemented as a system. The system includes a coiled tubing (or drill pipe), a lost circulation fluid, and a cable heater. The coiled tubing is disposed in a wellbore formed in a subterranean formation. The coiled tubing is configured to enable flow of the lost circulation fluid. The lost circulation fluid is configured to seal a lost circulation zone at a downhole location in the subterranean formation. The lost circulation fluid includes a eutectic metal alloy. The eutectic metal alloy includes multiple metals. The eutectic metal alloy has a melting temperature that is less than a melting temperature of each metal of the multiple metals that make up the eutectic metal alloy. The eutectic metal alloy is configured to liquefy in response to being heated to a temperature equal to or greater than the melting temperature of the eutectic metal alloy. In some implementations, the lost circulation fluid includes a carrier fluid. In such implementations, the eutectic metal alloy is suspended in the carrier fluid. The eutectic metal alloy, in a liquefied state in response to being heated to the temperature equal to or greater than the melting temperature of the eutectic metal alloy, is configured to flow from the wellbore and into the subterranean formation. In implementations where the eutectic metal alloy is carried by the carrier fluid, the carrier fluid is configured to gel in response to exposure to a specified downhole temperature to form a seal with the eutectic metal alloy distributed across the seal. The seal is configured to prevent fluid from flowing from the wellbore and into the subterranean formation. The cable heater is coupled to the coiled tubing flowing the lost circulation fluid. The cable heater is located at the downhole location. The cable heater is configured to, in response to receiving power at the downhole location, heat the eutectic metal alloy to the temperature equal to or greater than the melting temperature of the eutectic metal alloy to liquefy the eutectic metal alloy.

This, and other aspects, can include one or more of the following features. The cable heater can include a heating element, an insulation layer, and a sheath. The heating element can be configured to generate heat in response to receiving power. The insulation layer can surround the heating element. The insulation layer can include magnesium oxide. The sheath can surround the insulation layer. The sheath can include steel. The system can include a bridge plug or packer positioned downhole of the downhole location within the wellbore. The bridge plug or packer can be sealed against an inner wall of the wellbore to prevent fluid from flowing further downhole past the bridge plug or packer. The eutectic metal alloy can have a density of at least 8.0 $g/cm^3$. The eutectic metal alloy can have a density in a range of from about 8.0 $g/cm^3$ to about 11.0 $g/cm^3$. The eutectic metal alloy can include particles having an average particle size in a range of from about 1 micrometer to about 0.25 centimeters. The liquefied eutectic metal alloy can have a viscosity of less than 5 cP. The liquefied eutectic metal alloy can have a viscosity in a range of from about 1 cP to about 5 cP. The carrier fluid can include bentonite clay. The carrier fluid can include a polymer and a crosslinking agent. The crosslinking agent can be configured to crosslink the polymer in response to exposure to the specified downhole temperature to form the seal. The seal can include the solidified eutectic metal alloy distributed across a crosslinked polymer matrix. The polymer can include hydroxyethyl cellulose.

Certain aspects of the subject matter described can be implemented as a method. A packer is positioned within a wellbore formed in a subterranean formation. The packer is expanded to seal against an inner wall of the wellbore, thereby preventing fluid from flowing past the packer. A lost circulation fluid is flowed through a coiled tubing into the wellbore. The lost circulation fluid includes a eutectic metal alloy and a carrier fluid. The eutectic metal alloy includes a mixture of multiple metals. The eutectic metal alloy has a melting temperature that is less than a melting temperature of each individual metal of the multiple metals making up the eutectic metal alloy. The carrier fluid includes hydroxyethyl cellulose and a crosslinking agent. The eutectic metal alloy is suspended in the carrier fluid. A cable heater coupled to the coiled tubing is placed at a downhole location within the wellbore, up hole of the expanded packer. After placing the cable heater at the downhole location, power is provided to the cable heater, thereby heating the eutectic metal alloy to a temperature greater than the melting temperature of the eutectic metal alloy to liquefy the eutectic metal alloy. The liquefied eutectic metal is flowed with the carrier fluid from the wellbore and into the subterranean formation, thereby exposing the carrier fluid and the eutectic metal alloy to a specified downhole temperature within the subterranean formation and causing the crosslinking agent to crosslink the hydroxyethyl cellulose and the eutectic metal alloy to solidify to form a seal. The seal includes the eutectic metal alloy (solidified) distributed across a crosslinked polymer matrix. The seal prevents fluid from flowing from the wellbore and into the subterranean formation. The packer is drilled through to remove the packer from the wellbore.

This, and other aspects can include one or more of the following features. The eutectic metal alloy can have a density of at least about 8.0 g/cm$^3$. The eutectic metal alloy can have a density in a range of from about 8.0 g/cm$^3$ to about 11.0 g/cm$^3$. The eutectic metal alloy can include particles having an average particle size in a range of from about 1 micrometer to about 0.25 centimeters. The liquefied eutectic metal alloy can have a viscosity of less than 5 centipoise (cP). The liquefied eutectic metal alloy can have a viscosity in a range of from about 1 cP to about 5 cP. The eutectic metal alloy can be suspended in a carrier fluid. The carrier fluid can include bentonite clay. The process can be repeated at a different downhole location where the subterranean formation is depleted/weakened to mitigate lost circulation.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
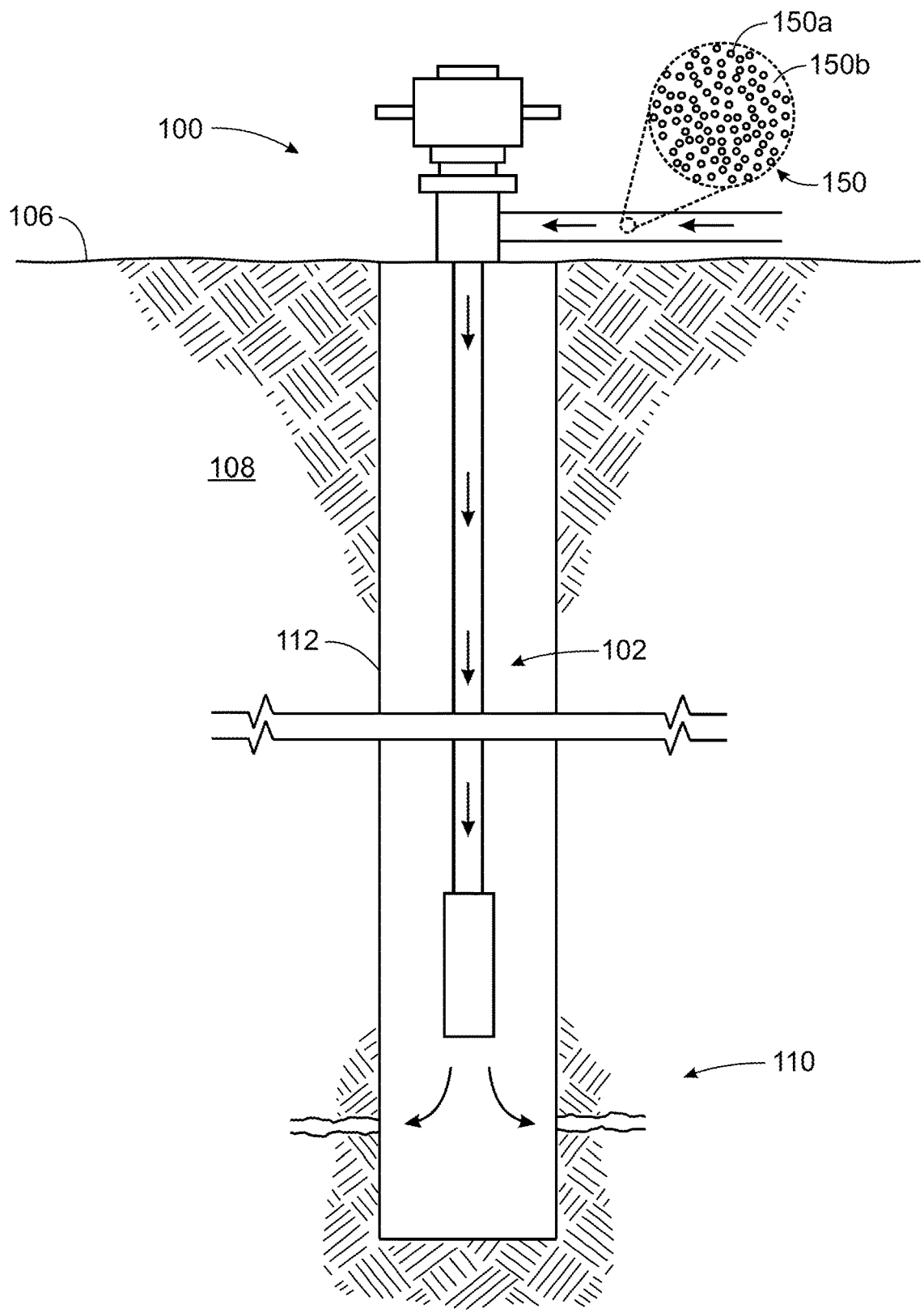
FIG. 1 is a schematic diagram of an example well.

This disclosure describes mitigating lost circulation in wells. The process includes flowing a eutectic metal alloy (in various forms, including solid particles or liquid suspensions) to a desired location in the well and using mineral insulated (MI) heating to melt the eutectic metal alloy. The liquefied alloy then flows into a desired zone in the subterranean formation and solidifies to form a seal. The process can be carried out by the use of coiled tubing and is repeatable, unlike conventional methods, for example, that use thermite. Conventional methods that use thermite heating can also be used to melt the eutectic metal alloy and seal a zone, but MI heating allows for more precise control of temperature and allows for continuous heating in downhole heating applications. Thus, multiple treatments with the eutectic metal alloy (or a different eutectic metal alloy) can be performed. The eutectic metal alloy can be, for example, in the form of beads or a powder suspended in a carrier fluid. In some implementations, the eutectic metal alloy is flowed to the desired location with a carrier fluid including a mixed metal oxide compound and bentonite clay. In some implementations, the eutectic metal alloy is flowed to the desired location with a carrier fluid including a cross-linked hydroxyethyl cellulose or a fiber-laden fluid in which the fibers provide a mechanical force for suspending the dense eutectic metal alloy particles.

The subject matter described in this disclosure can be implemented, to realize one or more of the following advantages. In contrast to conventional lost circulation mitigation processes that utilize thermite, MI heating can be deployed using coiled tubing. The processes and systems described can be used to control the location of the zone for heating within the subterranean formation. In contrast to conventional lost circulation mitigation processes that utilize thermite, MI heating can repeatedly treat a desired zone within the subterranean formation without requiring a pulling out of the hole (POOH) operation. The processes and systems described can be used to provide precise temperature control for heating the desired zone within the subterranean formation. In contrast to conventional lost circulation mitigation processes that utilize thermite, MI heating can provide continuous heat to the desired zone within the subterranean formation. The processes and systems described can be used to treat multiple zones within the subterranean formation without requiring a POOH operation. The processes and systems described can be implemented by deployment of MI heater(s) separate from a bottomhole assembly (BHA) or drill pipe, which can be less labor-intensive in comparison to conventional processes which use thermite heaters, which can require attachment to a drill pipe. In some implementations, the core of the MI heater can include an alloy that allows the MI heater to function as a Curie heater. For example, the alloy (making up the core of the MI heater) can be selected such that once its Curie temperature is reached, the temperature output of the MI heater remains the same regardless of power input to the MI heater. The Curie temperature of a material is the temperature above which the material loses its permanent magnetic properties.

FIG. 1 depicts an example well 100 constructed in accordance with the concepts herein. The well 100 includes a wellbore 102 that extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore 102 deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

During drilling of the well 100, operators may encounter a lost circulation scenario. In such cases, it may be necessary to halt drilling and mitigate the lost circulation. Mitigating and/or remedying the lost circulation in the well 100 can include flowing a lost circulation fluid 150 into the well 100. The lost circulation fluid 150 can be placed in a desired location within the well 100 (for example, the location of lost circulation) and form a seal to prevent fluid from flowing from the wellbore 102 and into the subterranean formation, thereby mitigating and/or remedying the lost circulation. Thermal modeling can be implemented to determine the optimal location for delivering the lost circulation fluid 150. For example, the desired location within the well 100 can be at the location of lost circulation (sometimes referred to as loss zone) or directly up hole of that location. Once the lost circulation fluid 150 is placed in the desired location within the well 100, the lost circulation fluid 150 can be heated to a temperature at which a component of the lost circulation fluid 150 melts/liquefies (for example, a melting point of a eutectic metal alloy 150a). Once liquefied, the alloy penetrates into the subterranean formation and flows into the pore(s)/fracture(s) of the subterranean formation. The formation temperature is cooler than the melting point of the eutectic metal alloy 150a and therefore causes the eutectic metal alloy 150a to cool rapidly, which in turn solidifies the eutectic metal alloy 150a. In some implementations, solidification of the eutectic metal alloy 150a in response to cooling upon exposure to the cooler formation temperature of the subterranean formation causes the eutectic metal alloy 150a to expand in volume, which further facilitates the sealing function of the seal that is formed. For example, solidification of the eutectic metal alloy 150a (from a liquid state to a solid state) can cause the eutectic metal alloy 150a to expand in volume in a range of from about 1% to about 3% or from about 1% to about 2%.

The lost circulation fluid 150 includes the eutectic metal alloy 150a. In some implementations, the lost circulation fluid 150 includes a carrier fluid 150b. The eutectic metal alloy 150a can be suspended in the carrier fluid 150b. In some implementations, the carrier fluid 150b can be omitted, and the eutectic metal alloy 150a can be delivered to a desired location in the well 100 independent of the carrier fluid 150b. The eutectic metal alloy 150a includes a mixture of metals. The eutectic metal alloy 150a has a melting temperature that is less than the melting temperature of each individual metal making up the eutectic metal alloy 150a. In some implementations, the eutectic metal alloy 150a has a density of at least about 8.0 grams per cubic centimeter ($g/cm^3$). For example, the eutectic metal alloy 150a has a density in a range of from about 8.0 $g/cm^3$ to about 15.0 $g/cm^3$, from about 8.0 $g/cm^3$ to about 14.0 $g/cm^3$, from about 8.0 $g/cm^3$ to about 13.0 $g/cm^3$, from about 8.0 $g/cm^3$ to about 12.0 g/cm³, from about 8.0 g/cm³ to about 11.0 g/cm³, or from about 8.0 g/cm³ to about 10.0 g/cm³. In some implementations, the eutectic metal alloy 150a is in bead or powder form. In some implementations, the eutectic metal alloy 150a includes particles that have an average particle size (for example, average diameter) in a range of from about 1 micrometer to about 0.25 centimeters. In some implementations, the eutectic metal alloy 150a (in a liquefied state) has a viscosity in a range of from about 1 centipoise (cP) to about 10 cP. For example, the liquefied eutectic metal alloy 150a has a viscosity that is less than 5 cP. For example, the liquefied eutectic metal alloy 150a has a viscosity that is similar to the viscosity of water.

In some implementations, the carrier fluid 150b includes metal oxides, such as silicon oxide, aluminum oxide, and iron oxide. For example, the carrier fluid 150b can include bentonite clay, sepiolite clay, attapulgite clay, or hectorite clay. In some implementations, the carrier fluid 150b includes a polymer and a crosslinking agent. In such implementations, the crosslinking agent is configured to crosslink the polymer to form a crosslinked polymer matrix. Examples of polymers that can be included in the carrier fluid 150b include hydroxyethyl cellulose, guar gum, polysaccharides (such as alginate), or polyacrylates. Examples of a crosslinking agent that can be included in the carrier fluid 150b are metal ions, such as chromium ions, titanium ions, zirconium ions, or aluminum ions.

Figure 2:
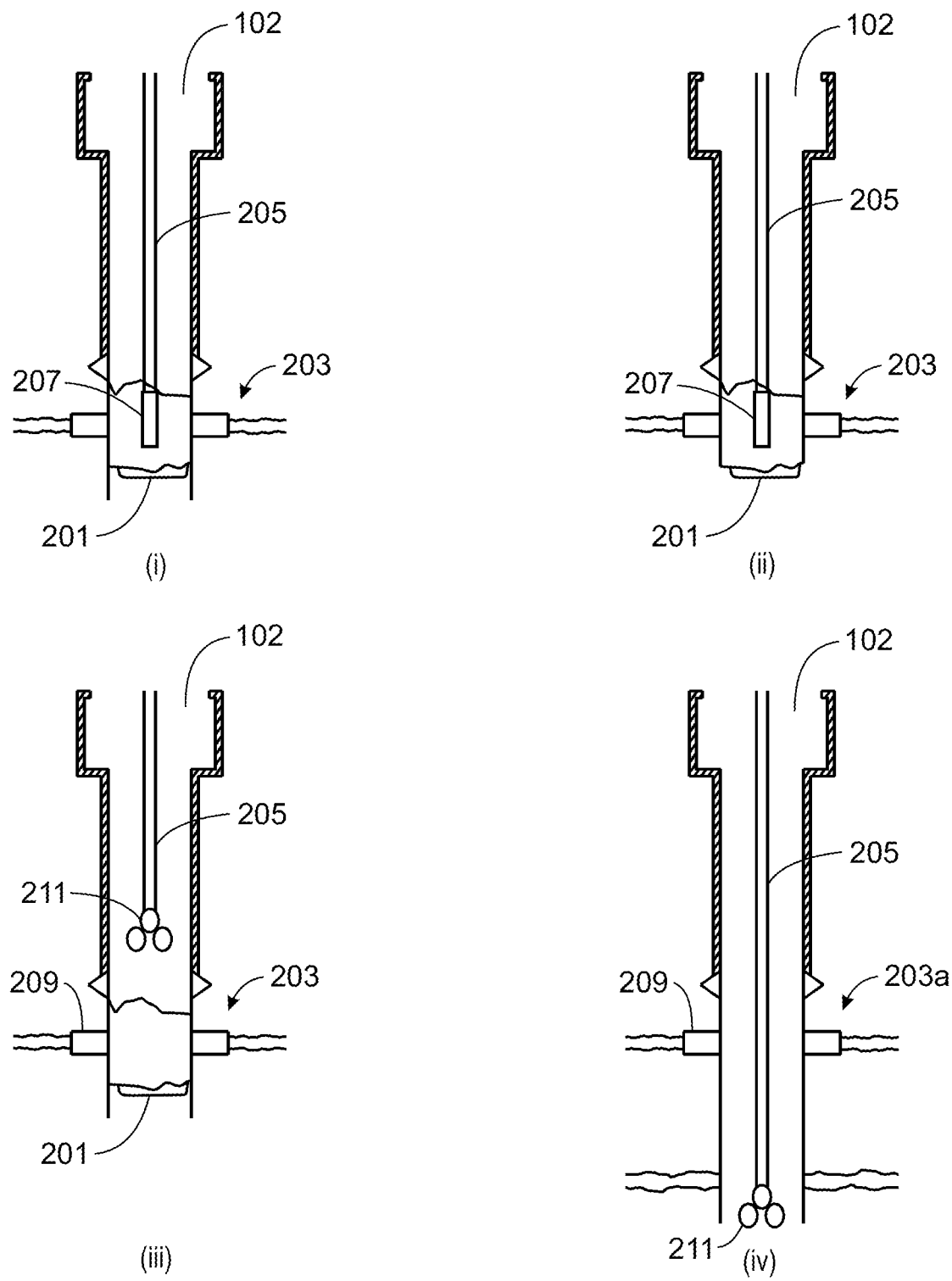
FIG. 2 is a progression of schematics depicting example stages of mitigating lost circulation in a well.

FIG. 2 is a progression 200 of schematics depicting example stages of mitigating and/or remedying lost circulation in a well, such as the well 100. At stage (i), drilling has already been halted to mitigate and/or remedy the lost circulation in the well 100. At stage (i), a bridge plug or packer 201 has been placed directly downhole of the desired location in the wellbore 102 that is in the vicinity of the lost circulation zone 203 of the subterranean formation. A lost circulation fluid (such as the lost circulation fluid 150) is flowed into the wellbore 102 through a coiled tubing 205 extending from the surface, such as the surface 106. A cable heater 207 coupled to the coiled tubing 205 and located in the desired location in the wellbore 102 is provided power. The cable heater 207 is configured to use the provided power to generate heat in the wellbore 102. The cable heater 207 is configured to heat the lost circulation fluid 150 to a temperature that is equal to or greater than a melting temperature of the eutectic metal alloy 150a, such that the eutectic metal alloy 150a melts (liquefies). The eutectic metal alloy 150a in a liquefied state flows with the carrier fluid 150b from the wellbore 102 and penetrates into the lost circulation zone 203 of subterranean formation. Exposure to the downhole temperature of the subterranean formation causes the carrier fluid 150b to gel.

At stage (ii), the carrier fluid 150b has gelled to form a seal 209. Ceasing power delivery to the cable heater 207 allows for the eutectic metal alloy 150a to cool and re-solidify. The seal 209 that has formed includes the eutectic metal alloy 150a (re-solidified) distributed across the seal 209. The re-solidified eutectic metal alloy 150a provides structural stability and reduced permeability to the seal 209. The seal 209 is configured to prevent fluid from flowing from the subterranean formation and into the wellbore 102. Thus, the seal 209 has mitigated and/or eliminated the lost circulation in the well 100. The cable heater 207 can be POOH.

At stage (iii), drilling can be re-started. The drill bit 211 can be rotated to mill a portion of the seal 209 that is positioned within the wellbore 102. The drill bit 211 can be rotated to mill the packer 201 that was placed in stage (i). Thus, the drill bit 211 can be rotated and mill through the seal 209 and the packer 201 and drill further downhole to continue drilling the wellbore 102 (for example, to increase the length of the wellbore 102 to penetrate deeper into the subterranean formation).

At stage (iv), the drill bit 211 has drilled through the seal 209 and the packer 201 and has drilled deeper into the subterranean formation. The lost circulation zone 203 has been mitigated and is no longer a lost circulation zone. The zone is labeled as a remedied zone 203a in stage (iv). If another lost circulation situation arises, the process can be repeated for the new lost circulation zone.

Figure 3A:
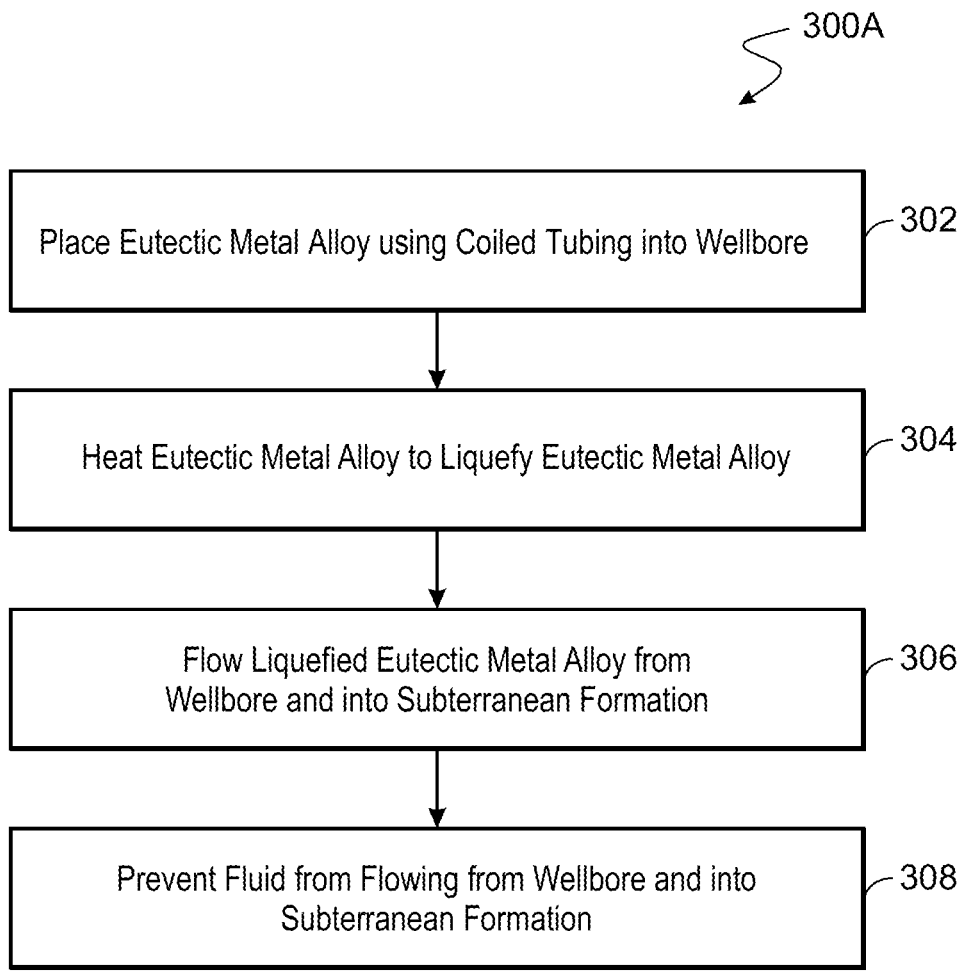
FIG. 3A is a flow chart of an example method for mitigating lost circulation in a well.

FIG. 3A is a flow chart of an example method 300A for mitigating and/or remedying lost circulation in a well, such as the well 100. At block 302, a eutectic metal alloy (such as the eutectic metal alloy 150a) is placed using a coiled tubing (such as the coiled tubing 205) into a wellbore (such as the wellbore 102) formed in a subterranean formation. In some implementations, placing the eutectic metal alloy 150a at a desired location within the wellbore 102 at block 302 includes dropping the eutectic metal alloy 150a using the coiled tubing 205 and allowing the eutectic metal alloy 150a to fall to the desired location due to the high specific gravity of the eutectic metal alloy 150a. In some implementations, placing the eutectic metal alloy 150a at a desired location within the wellbore 102 at block 302 includes placing the eutectic metal alloy 150a in a basket and positioning (using the coiled tubing 205) the basket carrying the eutectic metal alloy 150a at the desired location. In some implementations, placing the eutectic metal alloy 150a at a desired location within the wellbore 102 at block 302 includes deploying a thermite heater or an MI heater along with the eutectic metal alloy 150a downhole to the desired location in the wellbore 102. At block 304, the eutectic metal alloy 150a is heated to a temperature that is greater than the melting temperature of the eutectic metal alloy 150a to liquefy the eutectic metal alloy 150a. In some implementations, heating the eutectic metal alloy 150a at block 304 includes placing a cable heater (or a thermite heater) that is coupled to the coiled tubing 205 (such as the cable heater 207) at a downhole location in the wellbore 102 near the lost circulation zone 203 and then providing power to the cable heater 207 to generate the necessary heat for liquefying the eutectic metal alloy 150a. The level/amount of power provided to the cable heater 207 at block 304 can be directly related to the desired temperature for liquefying the eutectic metal alloy 150a. In some implementations, heating the eutectic metal alloy 150a at block 304 includes igniting a thermite heater to produce the necessary heat to liquefy the eutectic metal alloy 150a. Liquefying the eutectic metal alloy 150a at block 304 allows the eutectic metal alloy 150a to flow. At block 306, the liquefied eutectic metal alloy 150a is flowed from the wellbore 102 and into the subterranean formation. Flowing the liquefied eutectic metal alloy 150a from the wellbore 102 and into the subterranean formation at block 306 can include providing pressure to the wellbore 102 (for example, by a fluid) to force the liquefied eutectic metal alloy 150a to penetrate into the depleted/weakened zone of the subterranean formation. Flowing the liquefied eutectic metal alloy 150a into the subterranean formation at block 306 exposes the eutectic metal alloy 150a to downhole conditions (for example, a specified downhole temperature), which causes the eutectic metal alloy 150a to cool and solidify to form a seal (such as the seal 209). The seal 209 is formed in the depleted/weakened zone of the subterranean formation. At block 308, the seal 209 prevents fluid from flowing from the wellbore 102 and into the subterranean formation. Thus, the seal 209 remedies (mitigates and/or eliminates) the lost circulation in the well 100.

Figure 3B:
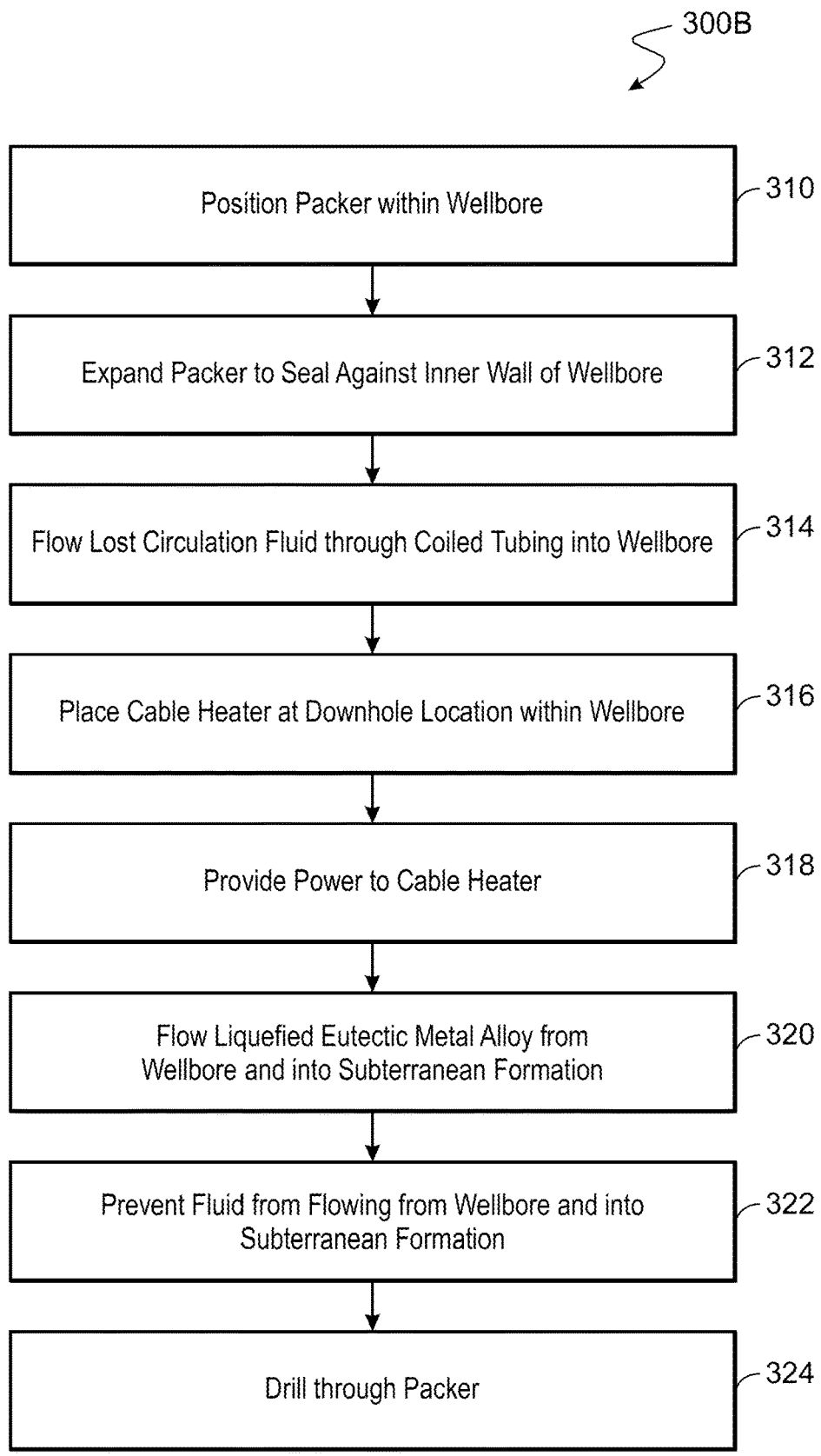
FIG. 3B is a flow chart of an example method for mitigating lost circulation in a well.

FIG. 3B is a flow chart of an example method 300B for mitigating and/or remedying lost circulation in a well, such as the well 100. At block 310, a bridge plug packer (such as the packer 201) is positioned within a wellbore formed in a subterranean formation, such as the wellbore 102). At block 312, the bridge plug or packer 201 seals against an inner wall of the wellbore 102 to prevent fluid from flowing past the bridge plug or packer 201. At block 314, a lost circulation fluid (such as the lost circulation fluid 150) is flowed through a coiled tubing (such as the coiled tubing 205) into the wellbore 102. In some implementations, after block 312 but prior to block 314, the drill string is pulled up hole to be positioned directly up hole of the weakened/depleted zone at which the lost circulation is occurring. In cases where the lost circulation fluid 150 includes only the eutectic metal alloy 150a (free of the carrier fluid 150b), the eutectic metal alloy 150a can be dropped through the coiled tubing to the desired location in the wellbore 102, carried by a basket to the desired location in the wellbore 102, or deployed with a heater (such as a thermite heater or MI heater) to the desired location in the wellbore 102. As described previously, in some implementations, the lost circulation fluid 150 includes a eutectic metal alloy 150a and a carrier fluid 150b, and the eutectic metal alloy 150a is suspended in the carrier fluid 150b. In some implementations, the carrier fluid 150b includes hydroxyethyl cellulose and a crosslinking agent. At block 316, a cable heater (such as the cable heater 207) that is coupled to the coiled tubing 205 is placed at a downhole location within the wellbore 102. The downhole location within which the cable heater 207 is placed at block 316 is in the vicinity (for example, directly up hole) of the locale of the lost circulation from the subterranean formation, such as the lost circulation zone 203. At block 318, power is provided to the cable heater 207, thereby heating the eutectic metal alloy 150a to a temperature that is greater than the melting temperature of the eutectic metal alloy 150a to liquefy the eutectic metal alloy 150a. The level/amount of power provided to the cable heater 207 at block 318 can be directly related to the desired temperature for liquefying the eutectic metal alloy 150a. Liquefying the eutectic metal alloy 150a at block 318 allows the eutectic metal alloy 150a to flow and penetrate into the subterranean formation. In cases where the eutectic metal alloy 150a is suspended in the carrier fluid 150b, the liquefied eutectic metal alloy 150a can flow with the carrier fluid 150b. At block 320, the liquefied eutectic metal alloy 150a is flowed (and in some cases, with the carrier fluid 150b) from the wellbore 102 and into the subterranean formation. Flowing the liquefied eutectic metal alloy 150a from the wellbore 102 and into the subterranean formation at block 320 can include providing pressure to the wellbore 102 (for example, by a fluid) to force the liquefied eutectic metal alloy 150a to penetrate into the depleted/weakened zone of the subterranean formation. In some implementations, flowing the liquefied eutectic metal alloy 150a with the carrier fluid 150b into the subterranean formation at block 320 exposes the carrier fluid to downhole conditions (for example, a specified downhole temperature), which causes the carrier fluid 150b to gel to form a seal (such as the seal 209). As described previously, the seal 209 can include the eutectic metal alloy 150a distributed across the seal 209. In some implementations, flowing the liquefied eutectic metal alloy 150a into the subterranean formation at block 320 exposes the eutectic metal alloy 150a to downhole conditions (for example, a specified downhole temperature), which causes the eutectic metal alloy 150a to cool and solidify to form a seal (such as the seal 209). The seal 209 is formed in the depleted/weakened zone of the subterranean formation. At block 322, the seal 209 prevents fluid from flowing from the wellbore 102 and into the subterranean formation. Thus, the seal 209 remedies (mitigates and/or eliminates) the lost circulation in the well 100. At block 324, the packer 201 is drilled through (for example, by rotating the drill bit 211 and milling the packer 201) to remove the packer 201 from the wellbore 102. Drilling can continue to lengthen the wellbore 102.

EXAMPLE

Figure 4A:
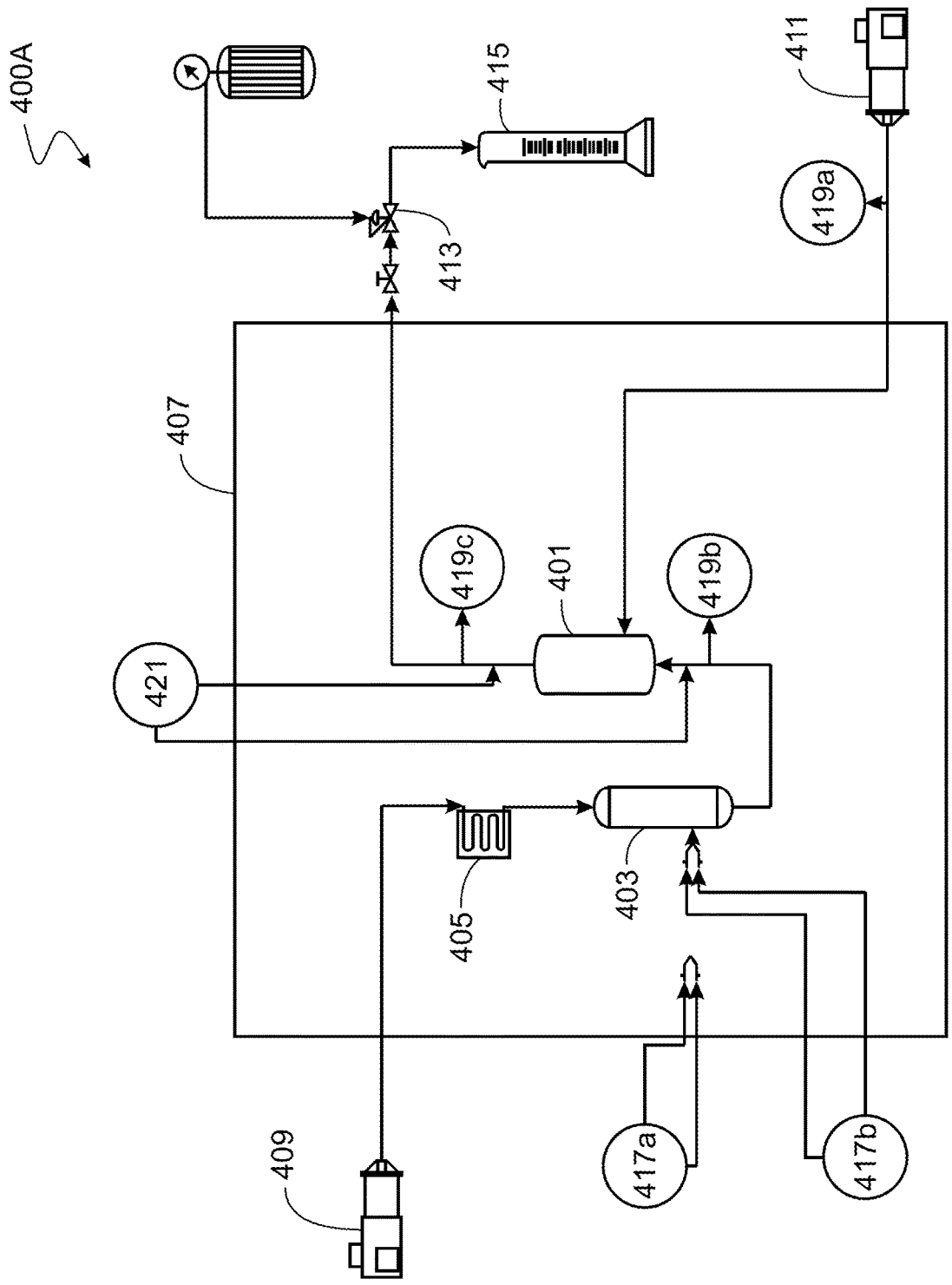
FIG. 4A is a schematic diagram of an example system for testing a lost circulation material.

FIG. 4A is a schematic diagram of an example system 400A for testing a lost circulation material, such as one or more components of the lost circulation fluid 150 (150a, 150b) or the lost circulation fluid 150 itself. The system 400A includes a core sample holder 401, an alloy transfer tank 403, a heat exchanger 405, an oven 407, a first pump 409, a second pump 411, a backpressure regulator 413, and a sump 415. The core sample holder 401 is configured to house a core sample (not shown). The alloy transfer tank 403 houses a eutectic metal alloy (such as the eutectic metal alloy 150a). For example, the alloy transfer tank 403 can house a bismuth-based alloy. The core sample holder 401, the alloy transfer tank 403, and the heat exchanger 405 are housed within the oven 407. The oven 407 is configured to provide heat to the components housed within the oven 407 to mimic downhole conditions. For example, the oven 407 maintains an internal temperature of about 155 degrees Celsius (° C.). The first pump 409 is fluidically connected to the heat exchanger 405. The heat exchanger 405 is fluidically connected to the alloy transfer tank 403. The alloy transfer tank 403 is fluidically connected to the core sample holder 401. The core sample holder 401 is fluidically connected to the second pump 411 and the backpressure regulator 413. Fluid can be discharged from the backpressure regulator 413 into the sump 415. The first pump 409 can provide flow of a fluid (such as the carrier fluid 150b) through the core sample housed by the core sample holder 401. For example, the first pump 409 can provide flow of a brine through the system 400A. In some implementations, the first pump 409 is set with a setpoint of about 100 pounds per square inch (psi). In some implementations, the first pump 409 provides a constant flow rate of about 0.02 milliliters per minute (mL/min). The heat exchanger 405 heats the fluid provided by the first pump 409 to a temperature that is sufficient to liquefy the eutectic metal alloy housed by the alloy transfer tank 403. For example, the heat exchanger 405 is configured to heat the fluid provided by the first pump 409 to about 5° C. greater than a melting temperature of the eutectic metal alloy housed by the alloy transfer tank 403. The fluid that has been heated by the heat exchanger 405 flows through the alloy transfer tank 403. As the fluid flows through the alloy transfer tank 403, the fluid liquefies the eutectic metal alloy 150a and carries the liquefied eutectic metal alloy 150a to the core sample holder 401. The second pump 411 and the backpressure regulator 413 cooperate to maintain an internal pressure within the core sample holder 401 to mimic downhole conditions. For example, the second pump 411 and the backpressure regulator 413 cooperate to maintain an internal pressure of about 600 psi within the core sample holder 401. For example, the second pump 411 provides a confining pressure of about 1,000 psi, while the backpressure regulator 413 maintains a backpressure of about 400 psi, which provides a net effective stress of about 600 psi within the core sample holder 401.

The system 400A can include various sensors for monitoring activity during experimentation. For example, the system 400A includes temperature sensor(s), pressure sensor(s), and/or resistance meter(s). In the implementation shown in FIG. 4A, the system 400A includes a first temperature sensor 417a, a second temperature sensor 417b, a first pressure sensor 419a, a second pressure sensor 419b, a third pressure sensor 419c, and a resistance meter 421. The first temperature sensor 417a can be coupled to the oven 407 and can be configured to measure the internal temperature of the oven 407. The second temperature sensor 417b can be coupled to the alloy transfer tank 403 and can be configured to measure the internal temperature of the alloy transfer tank 403. The first pressure sensor 419a can be coupled to a discharge of the second pump 411 and can be configured to measure a pressure of the fluid that is pressurized by the second pump 411. The second pressure sensor 419b can be positioned directly upstream of the core sample holder 401 and can be configured to measure a pressure of the fluid entering the core sample holder 401. The third pressure sensor 419c can be positioned directly downstream of the core sample holder 401 and can be configured to measure a pressure of the fluid exiting the core sample holder 401. The pressures measured by the second and third pressure sensors 419b, 419c can be compared to determine a pressure drop across the core sample holder 401. In some implementations, the second and third pressure sensors 419b, 419c are combined as a differential pressure sensor. The resistance meter 421 can include taps that are positioned directly upstream and downstream of the core sample holder 401 and can be configured to measure a resistance across the core sample holder 401. The measured resistance can be used to detect entry and breakthrough points of the eutectic metal alloy 150a across the core sample.

For a specific experiment, the eutectic metal alloy 150a tested was a bismuth-based metal alloy. The bismuth-based metal alloy had a density of 8.546 g/cm³. The system 400A allowed for injection of molten bismuth (150a) into a core sample held by the core sample holder 401 under isostatic stress at a temperature of 155° C. The core sample was saturated with brine before injection of the molten eutectic metal alloy 150a. The molten eutectic metal alloy 150a (bismuth) was injected at a constant rate of 0.02 cubic centimeters per minute (cc/min) with pressures monitored within 0.02% accuracy. The electrical resistance of the core sample was monitored by the resistance meter 421 at a 1 kilohertz (kHz) frequency to monitor bismuth entry and breakthrough. A control sample was tested with only brine, free of the bismuth-based metal alloy. Properties of the test sample (including the bismuth-based metal alloy) were measured prior to testing, after testing, after a tri-axial compression test, and after a tensile strength test (also referred to as a Brazilian test). The properties of the control sample and the test sample that were measured are provided in Tables 1 and 2.

TABLE 1

| Sample properties | | | | | | | | | | |
|---|---|---|---|---|---|---|---|---|---|---|
| Sample | L (cm) | D (cm) | V (cm³) | $V_g$ (cm³) | $V_p$ (cm³) | $\rho_g$ (g/cm³) | $\rho$ (g/cm³) | $\phi$ (%) | $k_b$ (mD) | $K_K$ (mD) |
| Control | 7.648 | 2.515 | 38.246 | 29.767 | 8.479 | 2.651 | 2.063 | 22.170 | — | 328 |
| Pre-Test | 7.644 | 2.524 | 37.994 | 29.661 | 8.333 | 2.655 | 2.072 | 21.933 | 215 | 329 |
| Post-Test | 6.353 | 2.518 | 31.636 | 27.376 | 4.260 | 3.244 | 2.807 | 13.465 | — | 6.4 |
| Tri-axial | 4.745 | 2.520 | 23.659 | 20.457 | 3.202 | 3.202 | 2.769 | 13.532 | — | — |
| Brazilian | 1.285 | 2.522 | 6.422 | 5.595 | 0.827 | 3.335 | 2.906 | 12.872 | — | — |

TABLE 2

| Sample properties, cont'd. | | | | | | | | | |
|---|---|---|---|---|---|---|---|---|---|
| Sample | $m_d$ (g) | $m_s$ (g) | $S_b$ (wt. %) | $P_c$ (psi) | MCS (psi) | BTS (psi) | $E_s$ (×10⁶ psi) | $v_s$ | $E_d$ (×10⁶ psi) | $v_d$ |
| Control | 78.741 | 78.741 | — | — | 10,327 | 412 | 2.15 | 0.310 | 3.46 | 0.220 |
| Pre-Test | 78.905 | 78.905 | — | — | — | — | — | — | — | — |
| Post-Test | 65.579 | 88.798 | 39.2 | 8.56 | — | — | — | — | — | — |
| Tri-axial | 48.980 | 65.501 | 37.4 | — | 14,001 | — | 2.14 | 0.271 | 4.76 | 0.220 |
| Brazilian | 13.264 | 18.659 | 45.0 | — | — | 803 | — | — | — | — |

Legend

L is length.
D is diameter.
V is bulk volume.
$V_g$ is grain volume.
$V_p$ is pore volume.
$\rho_g$ is grain density.
$\rho$ is bulk density.
$\phi$ is porosity.
$k_b$ is brine permeability.
$k_K$ is Klinkenberg permeability.
$m_d$ is dry weight.
$m_s$ is saturated weight.
$S_b$ is bismuth saturation.
$P_c$ is capillary entry pressure.
MCS is maximum compressive strength.
BTS is Brazilian tensile strength.
$E_s$ is Young's modulus (static).
$v_s$ is Poisson's ratio (static).
$E_d$ is Young's modulus (dynamic).
$v_d$ is Poisson's ratio (dynamic).

Figure 4B:
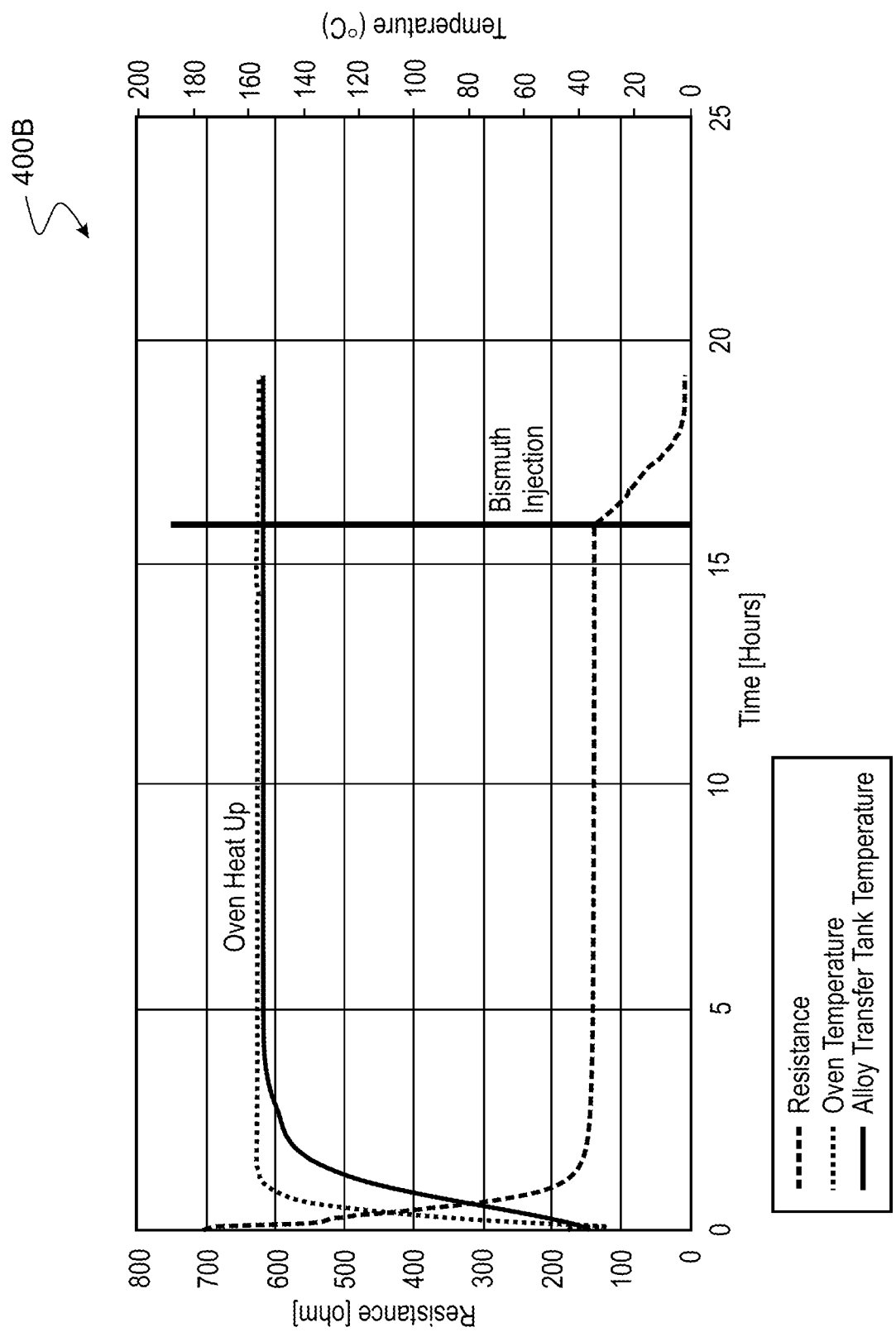
FIG. 4B is a graph showing resistance and temperature over time for an experiment testing a lost circulation material.

FIG. 4B is a graph 400B showing resistance and temperature over time for an experiment testing a lost circulation material. As shown in the graph 400B, when the bismuth injection reached the end of the core sample, the electrical resistance of the core sample dropped to essentially zero.

Figure 4C:
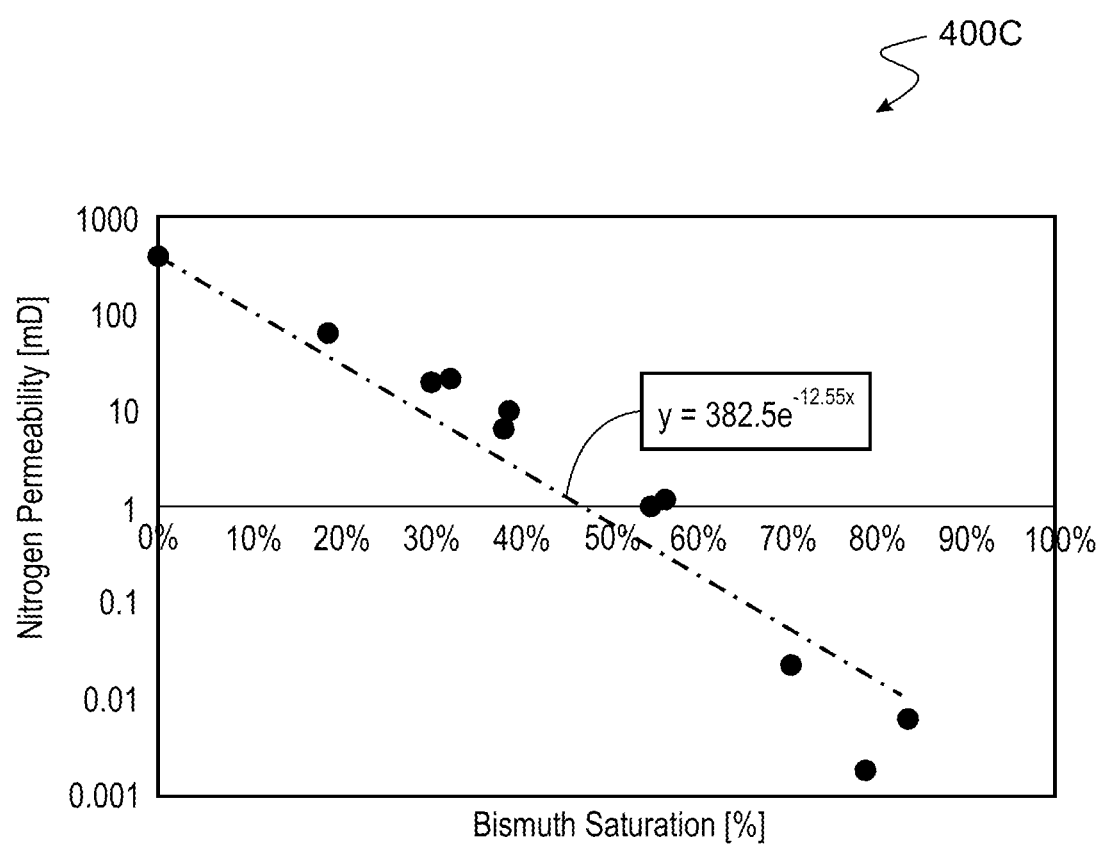
FIG. 4C is a logarithmic plot of nitrogen gas permeability versus bismuth saturation for an experiment testing a lost circulation material.

FIG. 4C is a logarithmic plot 400C of nitrogen gas permeability versus bismuth saturation. Nitrogen gas was used as the injection medium to measure permeability of the core sample. The variability shown in plot 400C is due to the distribution of the bismuth through the core sample, which was not controlled. The plot 400C suggests that permeability decreases as bismuth saturation increases due to reduced porosity, as more bismuth plugs the core sample.

Figure 4D:
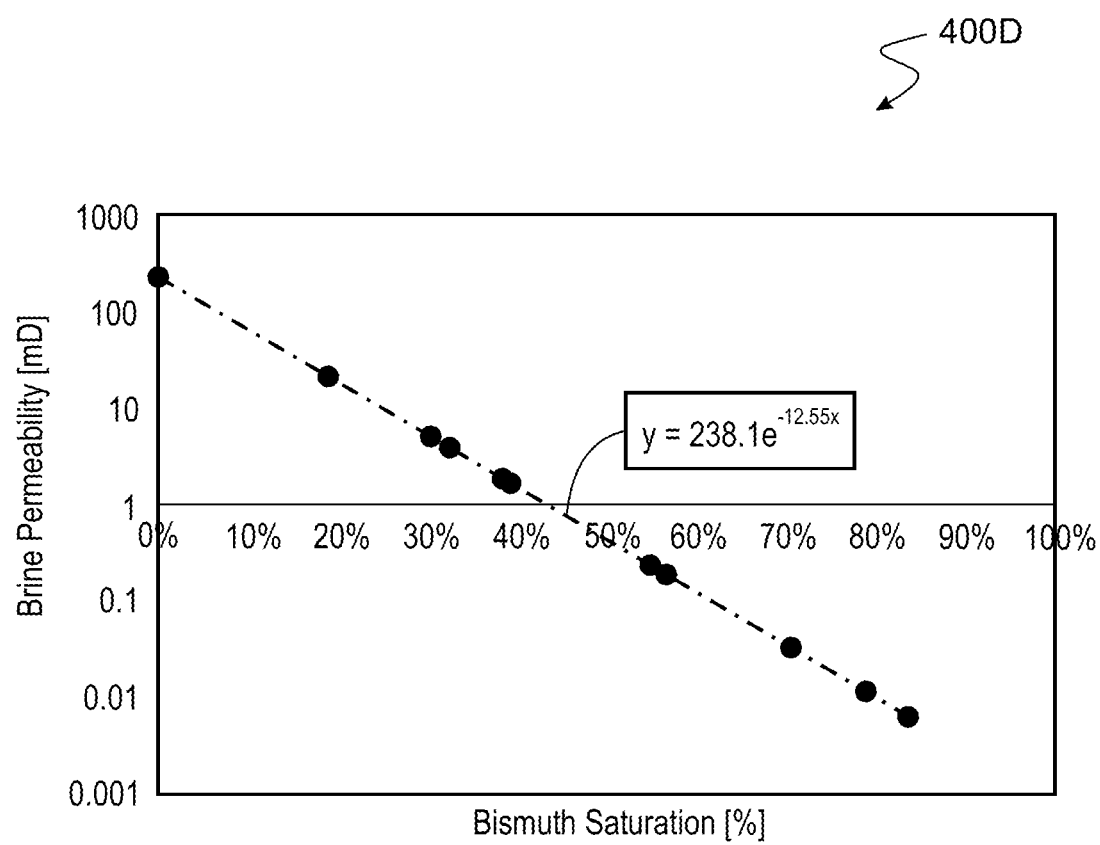
FIG. 4D is a logarithmic plot of brine permeability versus bismuth saturation for an experiment testing a lost circulation material.

FIG. 4D is a logarithmic plot 400D of brine permeability versus bismuth saturation. Brine was used as the injection medium to measure permeability of the core sample. Similar to the experiment carried out with nitrogen gas (plot 400C of FIG. 4D), the variability shown in plot 400D is due to the distribution of bismuth through the core sample, which was not controlled. The plot 400D is consistent with the plot 400C and affirms that permeability decreases as bismuth saturation increases due to reduced porosity, as more bismuth plugs the core sample.

Figure 4E:
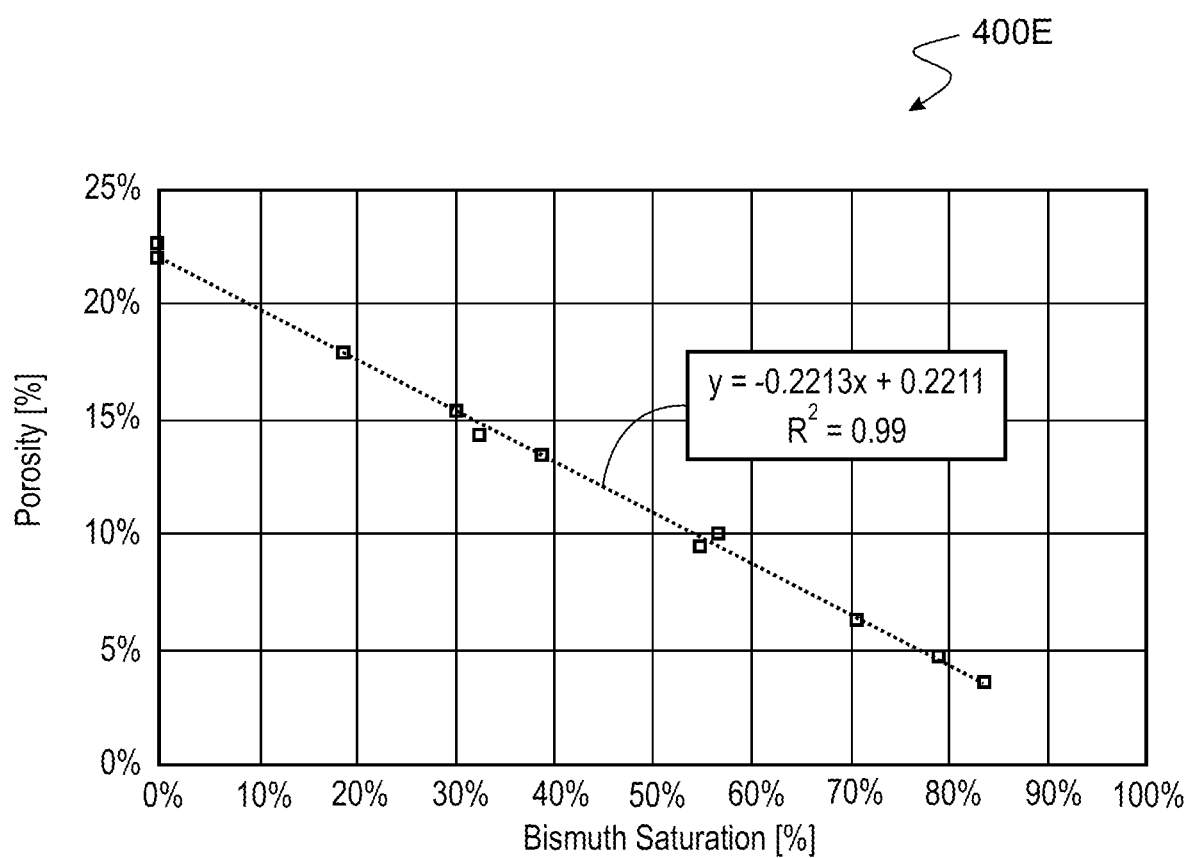
FIG. 4E is a graph showing porosity versus bismuth saturation for an experiment testing a lost circulation material.

FIG. 4E is a graph 400E showing porosity versus bismuth saturation. The graph 400E demonstrates that porosity decreases as more bismuth is injected and saturates the core sample. This relationship is consistent with the results shown in the plots 400C and 400D of FIGS. 4C and 4D, respectively. To obtain accurate porosity measurements, residual brine was removed from the core sample by soxhlet reflux extraction with methanol, the core sample was dried in an oven at 90° C., the core sample was weighed, and then the Boyle's Law method was applied to determine the pore volume of the core sample that was not occupied by the bismuth.

Figure 4F:
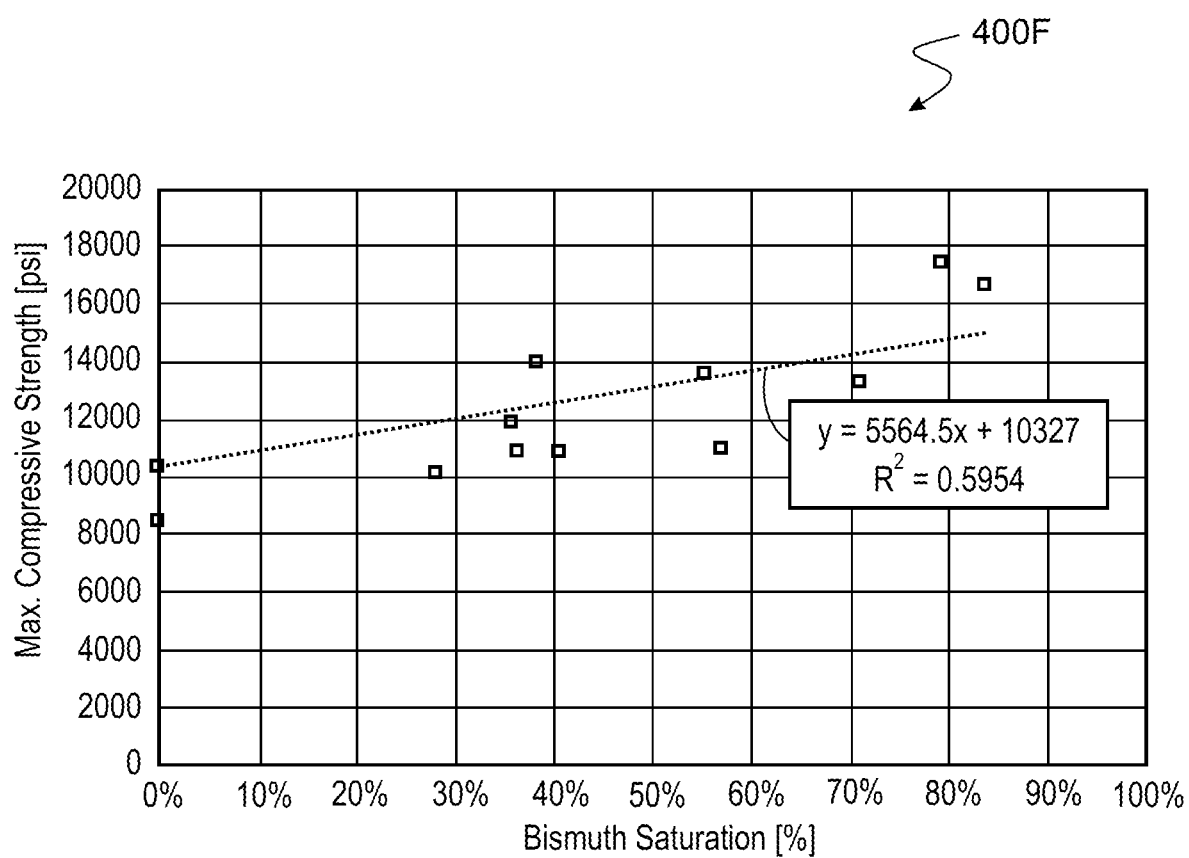
FIG. 4F is a graph showing compressive strength versus bismuth saturation for an experiment testing a lost circulation material.

FIG. 4F is a graph 400F showing compressive strength versus bismuth saturation. The graph 400F demonstrates the general trend that compressive strength of the core sample increases with bismuth saturation. The results shown in graph 400F suggest that increased injection of bismuth (directly related to bismuth saturation) results in reinforcement of the core sample (and in relation, the rock formation), thereby strengthening against failure.

Figure 4G:
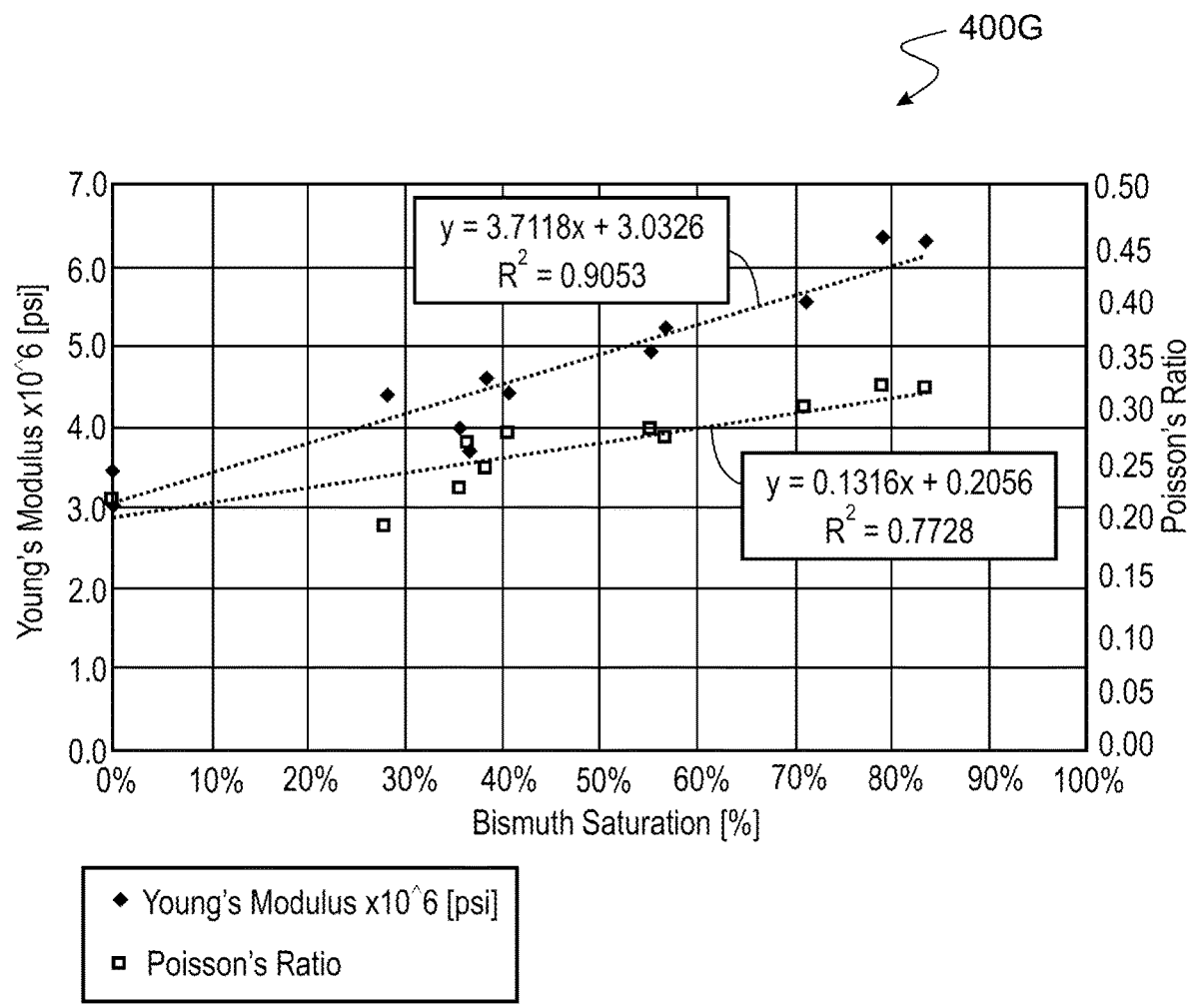
FIG. 4G is a graph showing Young's modulus and Poisson's ratio versus bismuth saturation for an experiment testing a lost circulation material.

FIG. 4G is a graph 400G showing Young's modulus and Poisson's ratio versus bismuth saturation. The graph 400G demonstrates the general trend that both Young's modulus and Poisson's ratio increase with bismuth saturation. The results shown in graph 400G suggest that increased injection of bismuth (directly related to bismuth saturation) results in increased stiffness of the core sample (and in relation, the rock formation).

Figure 4H:
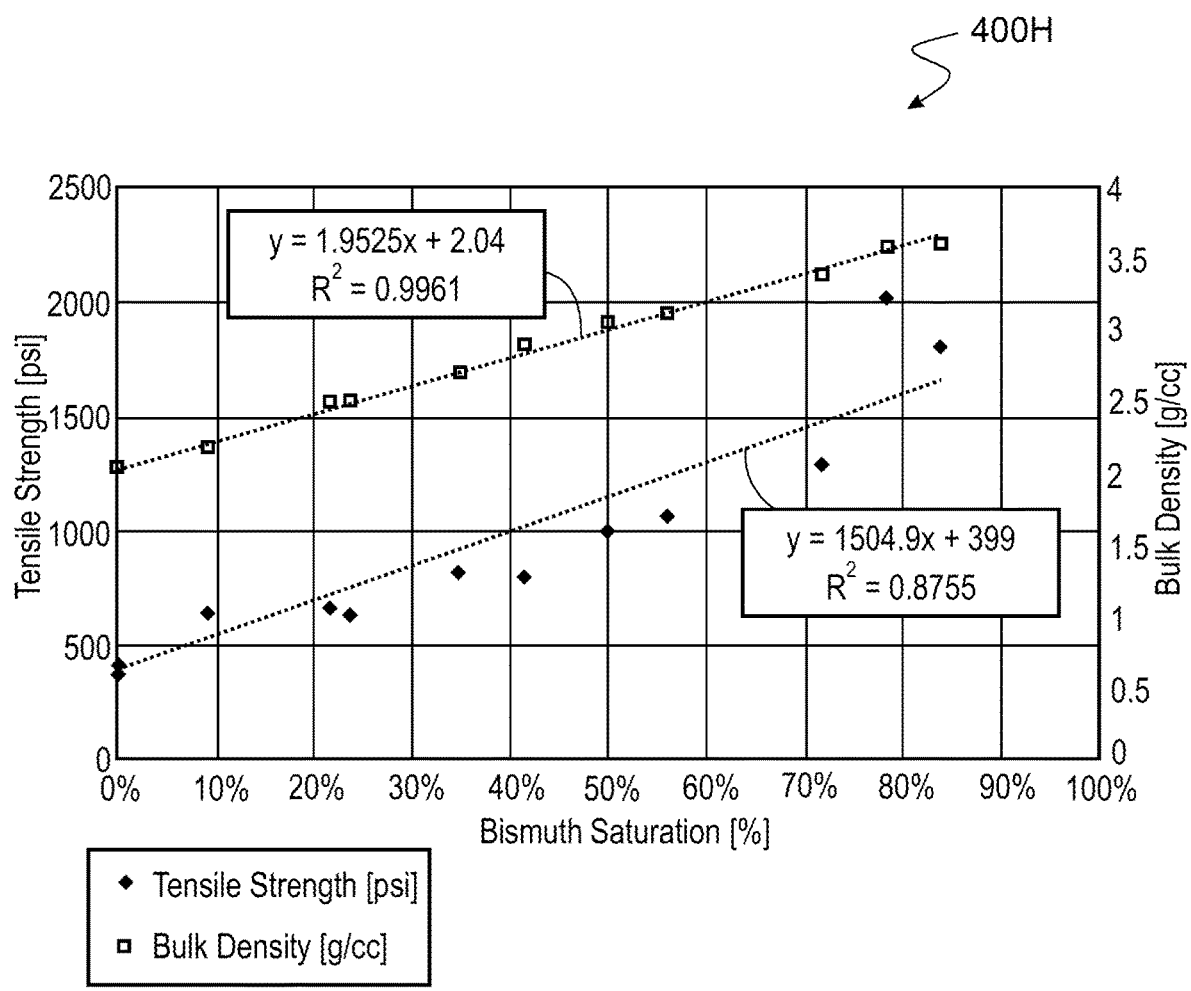
FIG. 4H is a graph showing tensile strength and bulk density versus bismuth saturation for an experiment testing a lost circulation material.

FIG. 4H is a graph 400H showing tensile strength and bulk density versus bismuth saturation. Tensile strength was determined by the Brazilian method. Tensile strength can be useful to monitor, given that induced fractures depend on tensile strength failure. The graph 400H demonstrates the general trend that both tensile strength and bulk density increase with bismuth saturation. The results shown in graph 400H suggest that increased injection of bismuth (directly related to bismuth saturation) results in decreased risk/probability of induced fracturing/failure. The increase in bulk density is consistent with the relatively high specific gravity of the eutectic metal alloy (bismuth) in relation to the core sample itself.

Figure 4I:
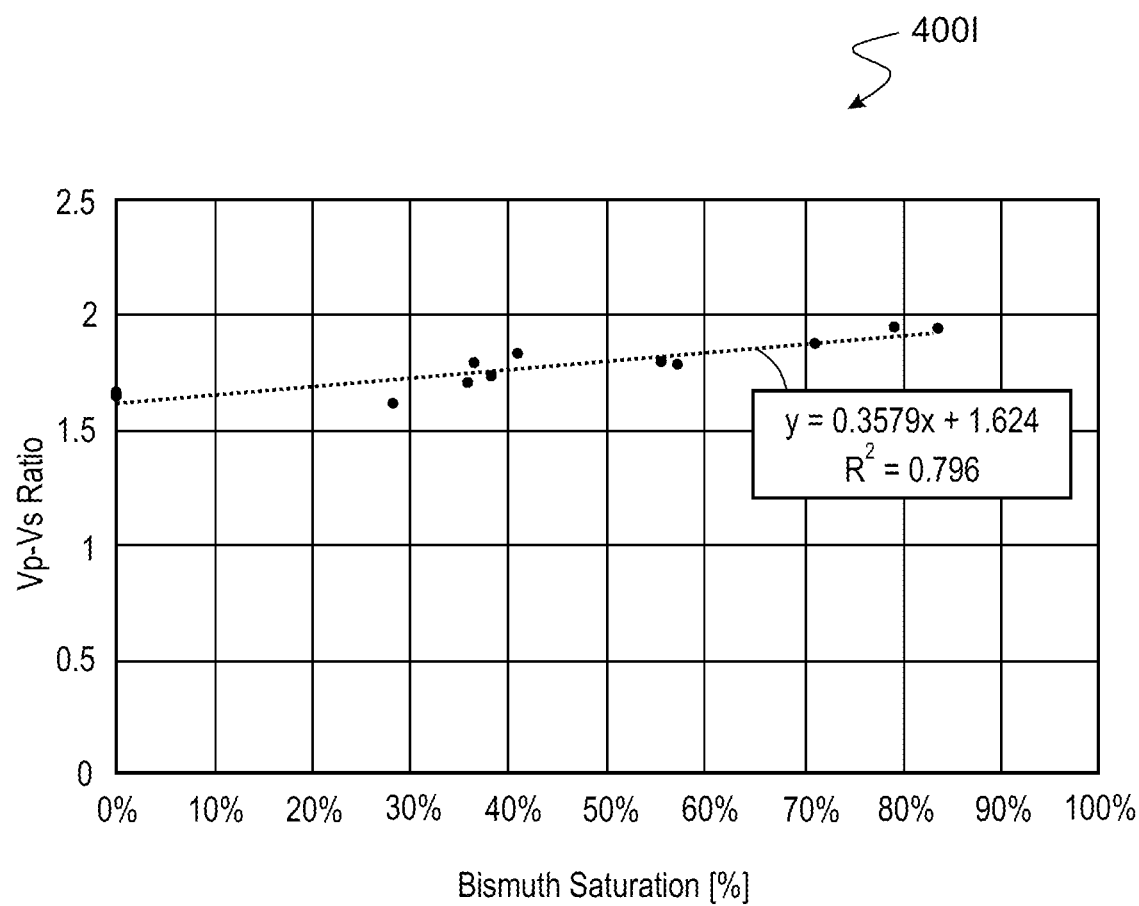
FIG. 4I is a graph showing results of a dynamic tri-axial test on a lost circulation material.

FIG. 4I is a graph 400I showing results of the dynamic tri-axial test. The Vp-Vs ratio is the ratio of horizontal P-wave velocity (also known as compressional wave velocity, Vp) to vertical S-wave velocity (also known as shear wave velocity, Vs). The graph 400I demonstrates the general trend that Vp-Vs ratio increases with bismuth saturation. The results shown in graph 400I confirm that stiffness of the core sample increases as bismuth injection (directly related to bismuth saturation) increases.

Figure 4J:
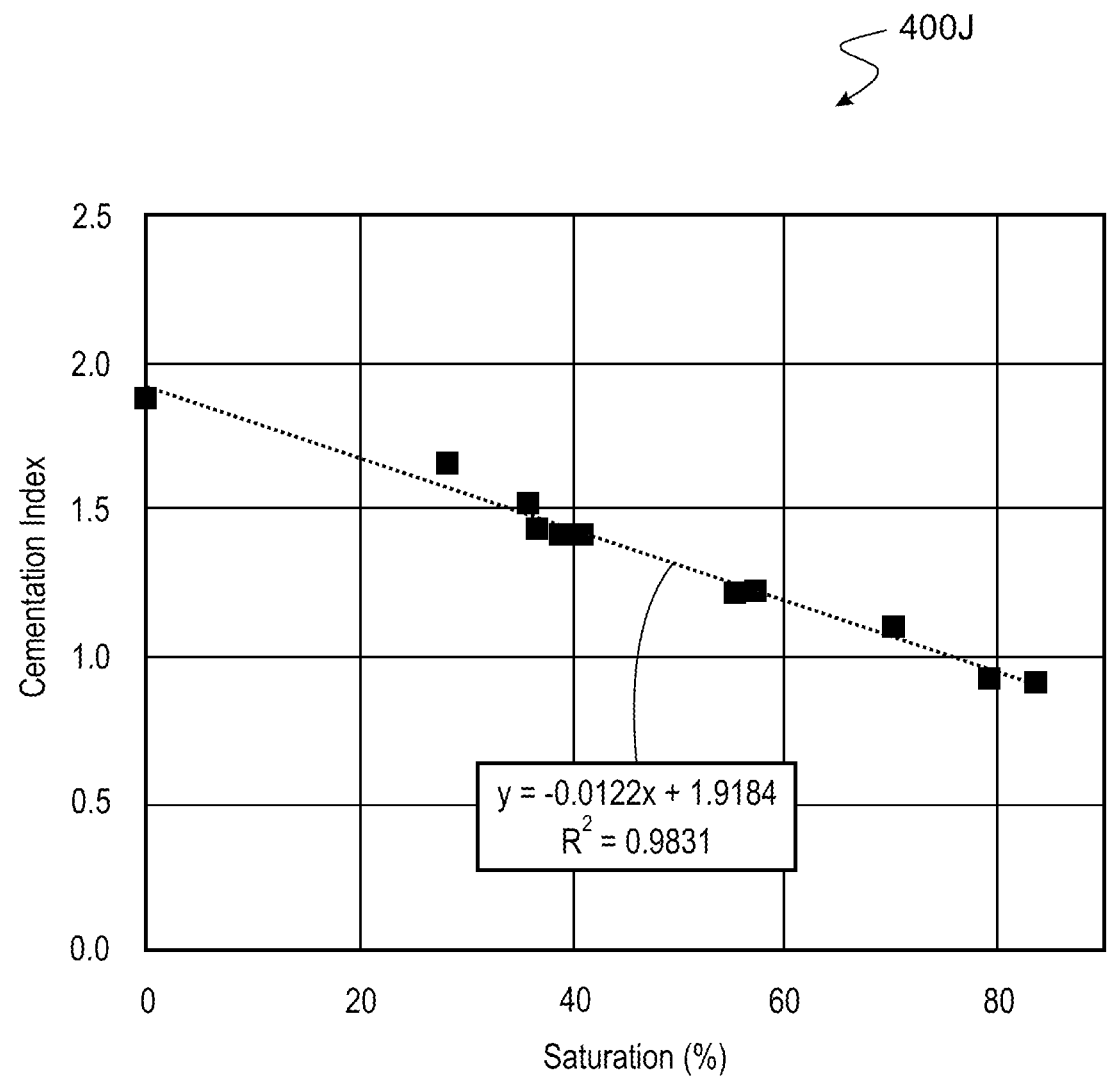
FIG. 4J is a graph showing cementation index versus bismuth saturation for an experiment testing a lost circulation material.

FIG. 4J is a graph 400J showing cementation index versus bismuth saturation. Cementation index is defined as the ratio between porosity and volumetric cement content combining the degree of compaction with the cement content. In this particular case, the characterization of cement has been adapted for rock formations. The trend of cementation index decreasing with bismuth saturation shown in graph 400J indicates that the sample is becoming stronger and less likely to fail (for example, lose structural integrity and break apart).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in an order, this should not be understood as requiring that such operations be performed in the order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
    placing a eutectic metal alloy with a coiled tubing into a wellbore formed in a subterranean formation, the eutectic metal alloy comprising a plurality of metals, the eutectic metal alloy having a melting temperature that is less than a melting temperature of each individual metal of the plurality of metals, the eutectic metal alloy comprising particles and suspended in a carrier fluid comprising a polymer and a crosslinking agent, the crosslinking agent configured to crosslink the polymer in response to exposure to a specified downhole temperature;
    heating the eutectic metal alloy to a temperature equal to or greater than the melting temperature of the eutectic metal alloy to liquefy the eutectic metal alloy;
    flowing the liquefied eutectic metal alloy from the wellbore and into the subterranean formation, thereby exposing the liquefied eutectic metal alloy to the specified downhole temperature within the subterranean formation and causing the liquefied eutectic metal alloy to solidify to form a seal comprising the solidified eutectic metal alloy distributed across a crosslinked polymer matrix; and
    preventing, by the seal, fluid from flowing from the wellbore and into the subterranean formation.

2. The method of claim 1, wherein heating the eutectic metal alloy comprises placing a cable heater coupled to the coiled tubing at a downhole location within the wellbore and providing power to the cable heater, wherein the cable heater comprises:
    a heating element configured to generate heat in response to receiving power;
    an insulation layer surrounding the heating element, the insulation layer comprising magnesium oxide; and
    a sheath surrounding the insulation layer, the sheath comprising steel.

3. The method of claim 2, comprising:
    prior to placing the eutectic metal alloy with the coiled tubing into the wellbore, positioning a bridge plug or packer downhole of the downhole location within the wellbore; and
    after positioning the bridge plug or packer and prior to placing the eutectic metal alloy with the coiled tubing into the wellbore, sealing the bridge plug or packer against an inner wall of the wellbore, thereby preventing fluid from flowing further downhole past the bridge plug or packer.

4. The method of claim 3, wherein the eutectic metal alloy has a density in a range of from about 8.0 g/cm$^3$ to about 11.0 g/cm$^3$.

5. The method of claim 4, wherein the particles of the eutectic metal alloy have an average particle size in a range of from about 1 micrometer to about 0.25 centimeters.

6. The method of claim 5, wherein the liquefied eutectic metal alloy has a viscosity in a range of from about 1 centipoise (cP) to about 10 cP.

7. The method of claim 6, wherein the eutectic metal alloy is suspended in a carrier fluid comprising bentonite clay.

8. A system comprising:
    a coiled tubing disposed in a wellbore formed in a subterranean formation, the coiled tubing configured to flow a lost circulation fluid;
    the lost circulation fluid configured to seal a lost circulation zone at a downhole location in the subterranean formation, the lost circulation fluid comprising:
    a eutectic metal alloy comprising a plurality of metals, the eutectic metal alloy having a melting temperature that is less than a melting temperature of each metal of the plurality of metals, the eutectic metal alloy configured to liquefy in response to being heated to a temperature equal to or greater than the melting temperature of the eutectic metal alloy; and
    a carrier fluid comprising a polymer and a crosslinking agent, wherein the eutectic metal alloy is suspended in the carrier fluid, wherein the eutectic metal alloy, in a liquefied state in response to being heated to the temperature equal to or greater than the melting temperature of the eutectic metal alloy, is configured to flow from the wellbore and into the subterranean formation, wherein the crosslinking agent is configured to crosslink the polymer in response to exposure to a specified downhole temperature to form a seal comprising the eutectic metal alloy distributed across a crosslinked polymer matrix, wherein the seal is configured to prevent fluid from flowing from the wellbore and into the subterranean formation; and
    a cable heater coupled to the coiled tubing flowing the lost circulation fluid, the cable heater located at the downhole location, wherein the cable heater is configured to, in response to receiving power at the downhole location, heat the eutectic metal alloy to the temperature equal to or greater than the melting temperature of the eutectic metal alloy to liquefy the eutectic metal alloy.

9. The system of claim 8, wherein the cable heater comprises:
    a heating element configured to generate heat in response to receiving power;
    an insulation layer surrounding the heating element, the insulation layer comprising magnesium oxide; and
    a sheath surrounding the insulation layer, the sheath comprising steel.

10. The system of claim 9, comprising a bridge plug or packer positioned downhole of the downhole location within the wellbore, the bridge plug or packer sealed against an inner wall of the wellbore to prevent fluid from flowing further downhole past the bridge plug or packer.

11. The system of claim 10, wherein the eutectic metal alloy has a density in a range of from about 8.0 grams per cubic centimeter (g/cm$^3$) to about 15.0 g/cm$^3$.

12. The system of claim 11, wherein the density of the eutectic metal alloy is in a range of from about 8.0 g/cm³ to about 11.0 g/cm³.

13. The system of claim 12, wherein the eutectic metal alloy comprises particles having an average particle size in a range of from about 1 micrometer to about 0.25 centimeters.

14. The system of claim 13, wherein the liquefied eutectic metal alloy has a viscosity in a range of from about 1 centipoise (cP) to about 10 cP.

15. The system of claim 14, wherein the viscosity of the liquefied eutectic metal alloy is less than 5 cP.

16. The system of claim 14, wherein the carrier fluid comprises bentonite clay.

17. The system of claim 14, wherein the polymer comprises hydroxyethyl cellulose.

18. A method comprising:
   positioning a packer within a wellbore formed in a subterranean formation;
   expanding the packer to seal against an inner wall of the wellbore, thereby preventing fluid from flowing past the packer;
   flowing a lost circulation fluid through a coiled tubing into the wellbore, the lost circulation fluid comprising:
      a eutectic metal alloy comprising a plurality of metals, the eutectic metal alloy having a melting temperature that is less than a melting temperature of each individual metal of the plurality of metals; and
      a carrier fluid comprising hydroxyethyl cellulose and a crosslinking agent, wherein the eutectic metal alloy is suspended in the carrier fluid;
   placing a cable heater coupled to the coiled tubing at a downhole location within the wellbore up hole of the expanded packer;
   after placing the cable heater at the downhole location, providing power to the cable heater, thereby heating the eutectic metal alloy to a temperature greater than the melting temperature of the eutectic metal alloy to liquefy the eutectic metal alloy;
   flowing the liquefied eutectic metal alloy with the carrier fluid from the wellbore and into the subterranean formation, thereby exposing the carrier fluid and the eutectic metal alloy to a specified downhole temperature within the subterranean formation and causing the crosslinking agent to crosslink the hydroxyethyl cellulose and the eutectic metal alloy to solidify to form a seal comprising the eutectic metal alloy distributed across a crosslinked polymer matrix;
   preventing, by the seal, fluid from flowing from the wellbore and into the subterranean formation; and
   drilling through the packer to remove the packer from the wellbore.

* * * * *